United States Patent [19]

Tiger

[11] 3,960,042

[45] June 1, 1976

[54] MICROFICHE READER-PRINTER

[75] Inventor: Emil Tiger, Highland Park, Ill.

[73] Assignee: Bell & Howell Company, Chicago, Ill.

[22] Filed: Dec. 23, 1974

[21] Appl. No.: 535,478

Related U.S. Application Data

[62] Division of Ser. No. 414,064, Nov. 8, 1973, Pat. No. 3,899,248.

[52] U.S. Cl. ................................... 83/583; 83/611
[51] Int. Cl.² ..................... B26D 7/26; B26D 5/08; B23D 15/04
[58] Field of Search ..................... 83/583, 582, 611

[56] References Cited
UNITED STATES PATENTS

| | | | |
|---|---|---|---|
| 3,376,775 | 4/1968 | Eliason | 83/582 |
| 3,855,891 | 12/1974 | Young | 83/582 |

*Primary Examiner*—Willie G. Abercrombie
*Attorney, Agent, or Firm*—Robert A. Walsh

[57] ABSTRACT

An improved microfiche reader-printer includes an electro-mechanical control mechanism, roll paper storage and feed mechanism, paper cutter and a corona paper charger unit in the upper portion of the machine. Disposed in the lower portion of the machine are a paper developer, dryer and discharge chute, a light source, microfiche carrier and an optical lens system. The optical system includes two moveably disposed mirrors selectively operable to project one selected fiche image either forwardly onto a viewing screen or rearwardly to an exposure station where a selected size paper is momentarily retained to permit exposure. The control mechanism functions to effect sequential operation of each of the machine elements whereby a selected fiche image is read and printed.

The paper cutter includes a unique cutting bar mounting arrangement which includes means for allowing pivotable movement at one end and horizontal movement only at the other end of the cutting bar to maintain it in contact with a rotary blade cam surface to provide proper cutting blade cutting bar overlap notwithstanding external torsional forces applied to the paper cutting mechanism.

The corona paper charging unit includes unique corona wire support means affording a corona structure of simple construction while assuring proper corona wire tension and insulation.

8 Claims, 9 Drawing Figures

MICROFICHE READER-PRINTER

RELATED APPLICATION

This is a division of application Ser. No. 414,064, filed Nov. 8, 1973, now U.S. Pat. No. 3,899,248.

This appliction is related to copending application Ser. No. 414,608, filed Nov. 8, 1973, now U.S. Pat. No. 3,898,004, and is assigned to the assignee of the present invention.

BACKGROUND OF THE INVENTION

The present invention in general relates to an apparatus for projecting a positive or negative image on a screen for viewing purposes and thereafter for projecting the image onto a charged sensitive paper to obtain a printed image and more particularly to an apparatus where such images are obtained from a microfiche. Still more particularly, the present invention relates to an improved paper cutter and corona charging unit, the improved cutter assuring smooth operation of the apparatus and the corona unit for printing the image onto the copy paper.

It is well known that modern copiers have revolutionized the reproduction and storage of information bearing documents. The present invention provides a single apparatus for both reading and printing a microfiche image, and which has an improved paper cutter and corona unit.

It is therefore a general object of the present invention to provide an improved microfiche reader-printer.

It is another object of the present invention to provide a microfiche reader-printer having an improved paper cutter and corona unit.

It is a still further object of the present invention to provide a paper cutter which assures jam-free operation.

It is a still further object of the present invention to provide an improved corona paper charging unit for use in a microfiche reader printer.

It is a still more particular object of the present invention to provide an improved corona paper charging unit of simplistic design.

SUMMARY OF THE INVENTION

The present invention provides a microfiche reader-printer comprising a housing to engage the apparatus, a control panel on the front of the housing, a microfiche carrier operably disposed on the front of the housing to receive a microfiche therein, a viewing screen disposed across the front of the housing, an image projector disposed to project a light beam through the microfiche and magnify the light beam, including a fiche image, a pair of reflecting mirrors movable to one position where the projected image beam is reflected to the back side of the screen to permit viewing thereof and a positioner mechanism mechanically operative to shift the positions of the mirrors to a second position to initiate a printing cycle. The microfiche reader-printer additionally comprises a motorized timing cam mechanically linked to effect the selective operation of the mirror positioning mechanism, a continuous paper supply source within the housing, a drive mechanism to feed the paper from the source, a paper measuring means, a rotary paper cutter comprising a frame comprising a pair of end vertical sidewalls and a horizontal support member therebetween, a rotary cutting blade having first and second ends and a traveler cam at each end, one cam being smaller in radius than the other and a blade mounted between the sidewalls for cutting engagement with the paper sheet above the paper sheet, a cutting bar having a cutting edge on the near end thereof, the cutting edge being disposed beneath the cutting blade for cooperative engagement with the blade to cut a paper sheet therebetween, the bar having first and second ends, the first end being mounted to one sidewall about a pivot at the far end of the bar and arranged for arcuate movement about the pivot, and the second end being mounted at the other sidewall and arranged for horizontal movement only, and means at each bar end for urging the bar ends against the blade cams, the different radii causing the blade to overlap the bar by a desired amount, and a paper sensitizer to place an electrostatic charge on the surface of the paper. A microfiche printer still further comprises a conveyor to receive and move the severed piece of paper to an exposure position where the paper is exposed to the light beam from one of the mirrors, a toner developing means disposed to receive the paper after exposure, a squeegee and dryer operative to dry the paper, a discharge chute to convey the sheet of paper to an outlet on the front of the housing, and a control circuit selectively operative to initiate a reading cycle and a succeeding printing cycle whereby any selected microfiche image may be readily read and a printed copy thereof obtained.

The present invention also provides a rotary paper cutter for cutting a sheet of paper horizontally fed therethrough comprising a frame comprising a pair of end vertical sidewalls and a horizontal support member therebetween, a rotary cutting blade having first and second ends and a traveler cam at each end, one cam being smaller in radius than the other and the blade mounted between the sidewalls for cutting engagement with the paper sheet above the paper sheet, a cutting bar having a cutting edge on the near end thereof, the cutting edge being disposed beneath the cutting blade for cooperative engagement with the blade to cut a paper sheet therebetween, the bar having first and second ends, the first end being mounted to one sidewall about a pivot at the far end of the bar and arranged for arcuate movement about the pivot, and the second end being mounted at the other sidewall and arranged for horizontal movement only, and means at each bar end for urging the bar ends against the blade cams, the different cam radii causing the blade to overlap the bar by a desired amount.

The present invention additionally provides a corona unit for electrostatically charging a layer of photoconductive material on a carrier member comprising a pair of elongated housings of generally U-shaped cross-section, each housing comprising a main cover section and a pair of sidewalls extending therefrom, a pair of spacers at each end of the unit for maintaining the housings in spaced parallel relation, a corona wire in each housing, each corona wire being looped to form parallel legs extending generally across each housing, a terminating post located at one end of each housing, each terminating post being secured to its associated housing main cover section between the sidewalls, each terminating post including clamping means for holding both ends of the associated corona wire in fixed relation to the main cover sections and sidewalls and for connecting operating voltages to the same, and a support post in each housing, located at the end opposite its respective terminating post and secured to the associated housing main cover section between the sidewalls, each support post adapted to receive the corona wire in that housing looped therearound and each support post including an integral tensioning member for maintaining associated corona wire under resilient tension.

DESCRIPTION OF THE PREFERRED EMBODIMENT

Figure 1:
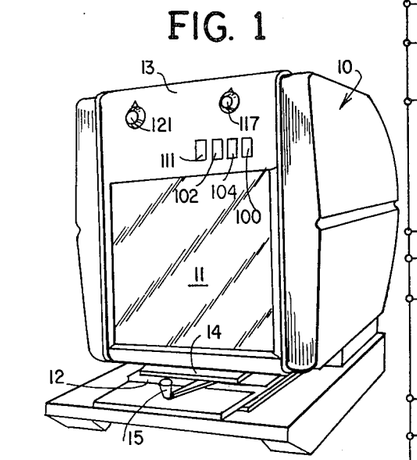
FIG. 1 is a perspective view of a microfiche reader-printer.
Figure 2:
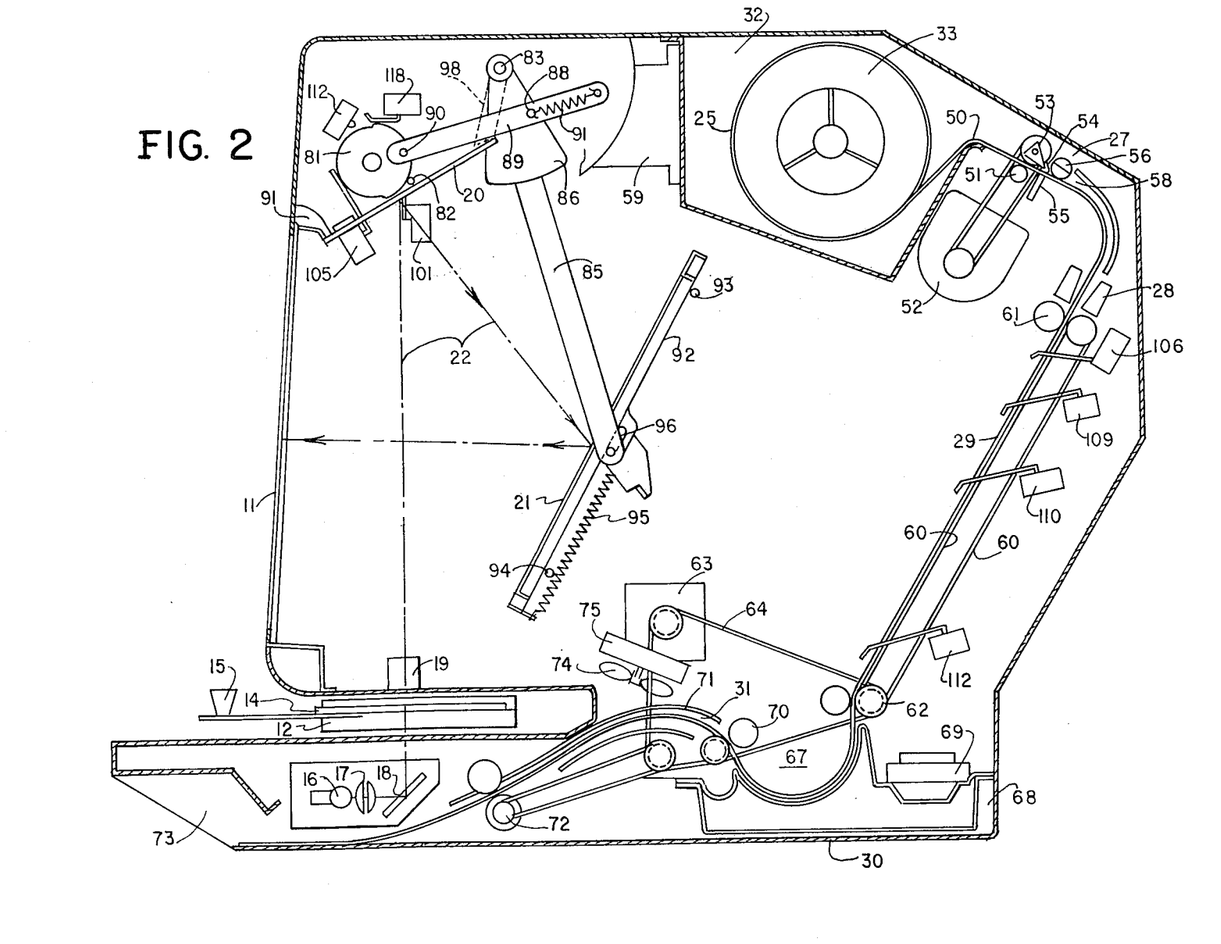
FIG. 2 is a vertical section of the apparatus of FIG. 1 showing the location of the principle components as well as the position of the mirrors to enable viewing of the microfiche image on a screen.

A microfiche reader-printer embodying the present invention is shown in FIGS. 1 and 2. The microfiche reader-printer is contained in a housing 10 having a glass screen 11, a microfiche carrier 12, and a control panel 13 on the front side for ready accessibility. A microfiche 14 on carrier 12 is controllably positioned by control arm 15 for selecting any image on the microfiche for viewing on screen 11.

A dual intensity halogen lamp 16 mounted in the base of housing 10 beneath carrier 12, provides a light beam which is directed horizontally through a lens 17 to a mirror 18 which directs upwardly through fiche 14 to project the selected image to a floating magnification lens assembly 19. The projected light beam is directed vertically to mirror 20, angularly to mirror 21, and to the back side of opaque screen 11 whereupon the image can be viewed to permit the operator to select the desired image. The path of the image projection for reading purposes is shown by the dash lines 22 in FIG. 2.

Figure 3:
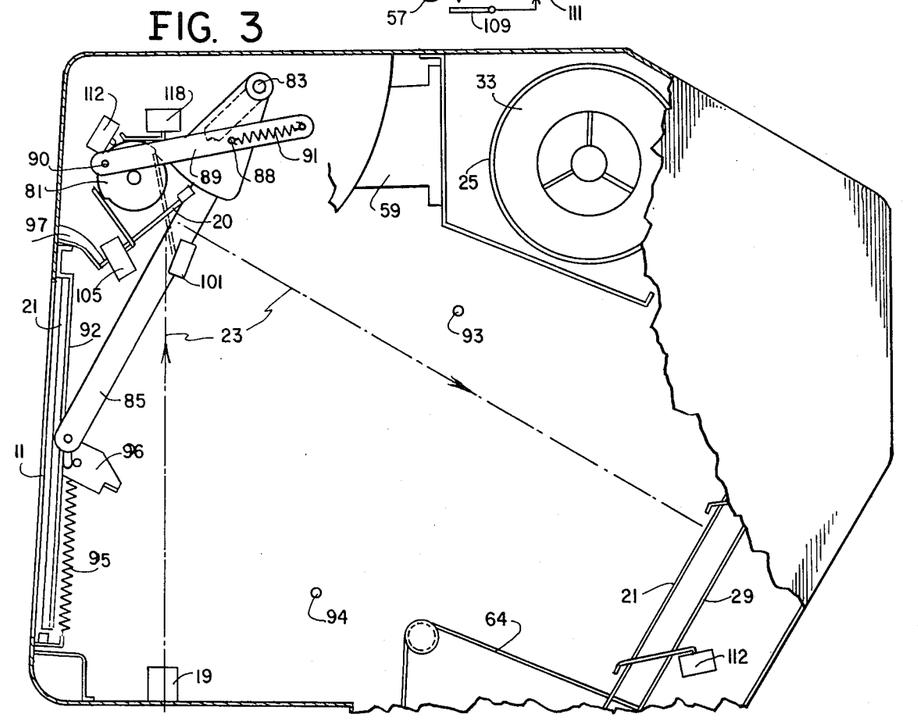
FIG. 3 is another vertical section of the microfiche reader-printer of FIG. 1 with the mirrors positioned to enable a microfiche image to be projected and printed on sensitized paper.

For printing purposes, the path of the image projection is redirected to that shown by the dash lines 23 in FIG. 3. This is accomplished by the repositioning of mirrors 20 and 21. The angular position of mirror 20 is changed by means of a cam control mechanism, hereinafter described in detail, to direct the image projection rearwardly within the housing. Similarly, mirror 21 is repositioned to shift forwardly into full abutting engagement with the back side of screen 11 whereby exterior light through the housing is completely blocked to provide a light tight enclosure to permit exposure of sensitized paper during the image printing sequence.

The other components within the housing 10 serve to provide means for providing enlarge prints from the projected microfiche image. These components include a paper roll retainer 25, a paper cutting device 27, a corona paper charging unit 28, a conveyor 29, a sensitized paper toner and dryer 30 and a paper discharge conveyor and chute 31.

The paper roll retainer or spool 25 is rotatably mounted within a compartment 32 in the upper portion of the housing 10. The top panel of the housing is readily movable to permit immediate access to the spool 25 within the compartment. Thus, a roll of paper 33 can be easily installed on the retainer or spool after the spool has been removed from the compartment. The structure of spool 25 permits the use of paper rolls of different widths. Thus, if the magnification of the fiche image permits printing on a smaller size sheet, the operator need only make a simple adjustment on the spool. The details of the particular spool construction are fully disclosed in the aforementioned copending application.

Paper is withdrawn from the roll 33 over a lead guide bar 50 through engagement with a feed roller 53 which is belt driven by means of a feed motor 52. An idler 51 engages the feed roller 53 so that the paper passes therebetween and into engagement with a guide bar 54 which directs the paper into paper cutter 27. Although subsequently more fully described, the paper cutter 27 comprises a cutter bar 55 disposed beneath the paper and a rotary cutter blade 56 disposed above the paper. The rotary blade 56 is actuated by means of a solenoid.

Paper is directed into a guide chute 58 through a corona paper charging unit 28 where the paper is electrostatically sensitized. The function of such a corona device is well known and therefore will not be detailed herein.

The corona unit 28 is electrically operated through a power pack 59 mounted in the housing 10. Thereafter, the paper is directed through conveyor 29 which is comprised of a series of adjacently disposed belts 60 angularly positioned in the rear portion of the housing to receive the sheet of paper and carry it downwardly to a position where it can be exposed. Engagement of the paper with the belt in a perfectly flat position is insured through the operation of an idler roller 61 which engages the paper at the same instant that the paper engages the belt. The belts 60 are mounted on a common drive shaft 62. The drive shaft 62 is power driven by a drive motor 63 which is connected thereto by a chain and sprocket mechanism 64.

After the exposure cycle has been completed, the exposed sheet of paper is fed downwardly into a well 67 integrally formed in a removable toner tray 68. Prior to the entry of the paper into the well 67 toner fluid is pumped from the lower part of the tray 68 into the well by pump 69 to fully immerse the paper in the fluid during the period in which it passes through the well. Immediately upon leaving the well, the paper is engaged by a pair of rollers 70 which force all of the excess fluid from the paper and return it to the well.

The paper is thereafter fed into a curved guide 71 which feeds the paper forwardly and downwardly into engagement with power driven rollers 72 until the paper is delivered into a discharge chute 73 at the front end of housing 10. While the paper is traveling forwardly to the discharge chute, it is subjected to a stream of air which is created by fan 74 which is power driven by motor 75. The fan serves a dual purpose in that it provides a stream of air to rapidly dry the print and also provides a stream of air which cools lamp 16.

Thus, the extreme heat which is created by the high intensity lamp 16 will be rapidly dissipated and the life of the lamp considerably prolonged.

The toner tray 68 is completely self-contained for developing sensitized sheets of paper passing therethrough. Liquid is normally contained in the bottom of the tray and is pumped into the well 67 by means of pump 69 only during the period in which sheets of paper are passed therethrough. Any liquid remaining in the well automatically drains back into the bottom part of the tray. The entire tray may be readily removed through an opening in the rear portion of housing 10.

The proper positioning of mirrors 20 and 21 is effected by means of a power drive, including a timer motor which rotates cam disc 81.

For reading a microfiche, the morrors are in the position shown in FIG. 2. Mirror 20 is supported for pivotal movement on a shaft 82 while mirror 21 is operably supported on a shaft 83 with both of the safts mounted on the housing 10. The mirror 21 is carried on a pair of support arms, one of which is support arm 85 and the other being located directly behind support arm 85 which are adjustably secured to the shaft 83. A linkage arm 86 is mounted on the end of the shaft externally of the housing wall. A pin 88 is secured in the arm 86. Because the cam disc 81 is likewise mounted exteriorly of the housing wall, a connecting arm 89 is disposed to connect the disc 81 and arm 86. A pin 90 mounted transversely in the disc provides the linkage with the arm 89 while a slot in the arm is disposed to fit over pin 88 in the arm 86. A spring 91 secured to the end of connecting arm 89 and to the extending end of the pin 88 on arm 86 serves to provide a cushioning effect at the moment when the mirror 20 is moved rearwardly to the extreme position shown in FIG. 2.

When so positioned, a plate 92 supporting the mirror 21 is in abutment with interiorally extending pins 93 and 94 secured to the sidewalls of housing 10. A spring 95 secured to the bottom of plate 92 extends upwardly and is attached to the pin mounted in the lower ends of each of the support arms. Such pins extend through slot 96 in rearwardly extending ears from plate 92. The springs serve to retain the mirror in its uppermost position whenever it is conditioned for the reading mode. At the same time an arm 98 secured to shaft 83 will have rotated counter-clockwise so that the arm will engage the back side of mirror 20 and cause it to tilt downwardly to the position shown in FIG. 2. At this time the microfiche image projected from the magnifying lens 19 will strike the mirror 20 and be deflected to mirror 21 and to the back side of screen 11. An operator can then readily determine whether the image is one which should be printed.

If the image is the selected one, the initiation of a printing cycle will cause the cam disc 81 to rotate counter-clockwise in a manner whereby the arm 89 will move forwardly from the position shown in FIG. 2 to the position shown in FIG. 3. Shaft 83 will be rotated so that arm 98 will be disengaged from the back side of mirror 20, so that the mirror can tilt upwardly to the position shown in FIG. 3. Rotation of shaft 83 likewise causes the support arms 85 to move forwardly to permit the mirror and backing plate to initially pivot about fixed pins 94. Thus, the mirror will tilt from the reading mode position forwardly so that its upper edge will lead the lower edge as the arms continue to move until the upper edge of mirror plate 92 engages the rear side of screen 11. The upper edge of the plate will strike the screen frames in the vicinity of the top edge and permit the plate to slide upwardly until it reaches a stop 97. Continued movement of arms 85 will cause the lower portion of the mirror plate 92 to move forwardly until the entire face of the mirror abuts the rear face of screen 11. In this position, mirror 21 precludes light from entering into the housing through the screen. At this time, a microfiche image projected through the magnifying lens 19 will strike the mirror 20 along the path indicated by the dash lines 23 to project the image onto the sensitized paper positioned for exposure in the rearward portion of the apparatus.

When the apparatus is recycled for its succeeding reading operation, the support arms 85 will again move rearwardly from the position shown in FIG. 3. At that time the springs 95 connected to the plate 92 will pull downwardly on the pin in slot 96 and cause the mirror to return to the same tilted position so that the top edge thereof will become disengaged from the stop 97 and allow the mirror 21 to be moved rearwardly to the reading position.

Figure 4:
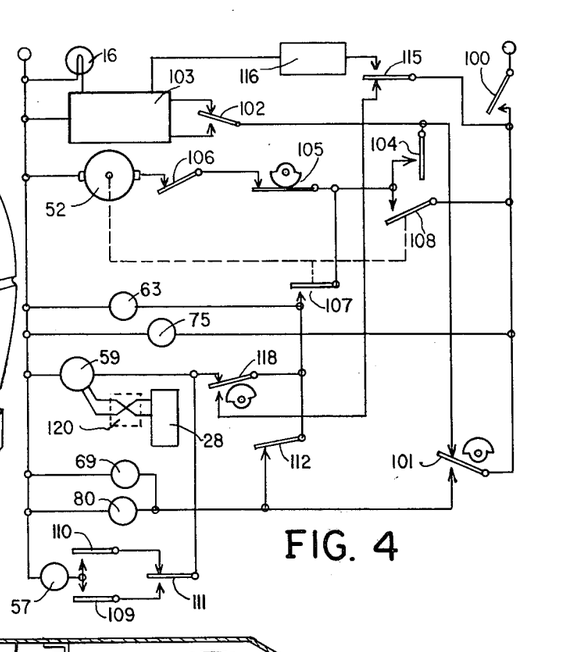
FIG. 4 is a schematic diagram of a control system for rendering the microfiche reader-printer operative.

The operating cycle of the apparatus is effected by means of the electrical circuitry depicted by the schematic diagram shown in FIG. 4. The circuit is energized initially through the manipulation of switch 100. This will cause the fan motor 75 to be energized and insure that the fan motor will constantly run. Simultaneously a circuit will be completed through a pair of normally closed contacts in a cam actuated microswitch 101 to a like selector switch 102. Dependent upon the lighting condition exteriorly of the apparatus, the operator will have previously set the switch 102 to provide either a low intensity light projection onto the screen 11 of a high intensity light projection onto the screen. Thus, a circuit will be completed through an appropriate winding within transformer 103 to the projection lamp 16. Since the mirrors 20 and 21 have previously been returned to a reading position, it is now possible to view the image on screen 11.

If the operator discovers that the microfiche in the carrier 12 is not the correct one, he can replace the same at this point. If the operator finds that the image on the screen is not the desired one, he can then adjust the carrier 12 position with arm 15 until another microfiche image is presented for viewing on screen 11.

If a print cycle is initiated, it is necessry to manually manipulate a print switch 104. This will serve to complete a circuit from the line serving switch 102 to the paper feed motor 52 whereby the feed motor is started to feed paper from roll 33 into the apparatus. Two normally closed microswitches are included in the feed motor circuitry. Feed motor switch 105 is cam controlled in order to permit the circuit to be interrupted as the cam disc is rotated when there is no paper in the machine. The other normally closed microswitch 106 is mounted on the framework immediately adjacent to the conveyor belt 60 in a manner to be actuated by the passage of paper at that point.

Whenever power is applied to the feed motor, a pair of switches 107 and 108 are actuated as a result of solenoidal operation responsive to energization of the feed motor. The closure of normally open switch 108 serves to continue the power supply to the feed motor. The closure of the normally open switch 107 serves to complete the circuit to the drive motor 63, the power pack 59, the pump 69, the timer motor 80, and the cutter solenoid 57. Upon timer motor 80 being energized, cam disc 81 will rotate to actuate switch 101 to complete a circuit through a normally closed microswitch to the drive motor 63, the power pack 59, the pump 69, timer motor 80 and the cutter solenoid 57. At the same time the engagement of the forward edge of the paper from roll 33 with switch 106 will cause the circuit to the feed motor to be interrupted. When power to the feed motor is discontinued, the switches 107 and 108 open. However, because the timer motor 80 is still energized, the cam 81 will continue to rotate. Both switches 109 and 110 are mounted on the frame so that the actuating arms are positioned to be engaged by the leading edge of the paper as it advances on conveyor belts 60. Because the operator will have manipulated a copy length selector switch 111 before the printing cycle is initiated, only one of these two switches will be in the circuit. The switch 109 serves to measure the short length of paper while switch 110 measures the long length of paper. Thus, the selector switch 111 is positioned to indicate that a long length of paper is desired, the switch will have been positioned as indicated in FIG. 4 whereby a circuit will be completed therethrough and the switch 111 through the cutter solenoid 57. Immediately upon the solenoid being energized, the cutter will operate to sever the paper at that indicated length whereby the sheet of paper can then advance until the edge thereof will engage the actuating arm of microswitch 112 interrupting the circuit to the drive motor 63, power pack 59, and solenoid 57. However, because the switch 101 is still positioned as previously described, the pump motor 69 and the timer motor 80 will remain energized.

Exposed of the sensitized paper is effected in the following manner. The rotation of cam disc 81 will cause mirrors 20 and 21 to be moved in the manner previously described where the microfiche image can be projected onto mirror 20 and rearwardly onto the paper. At the same time, pin 90 extending through the face of the cam disc will engage the actuating arm of the two-positioned microswitch 115. This completes the circuit from the main line through switch 115 to a dimmer relay 116, transformer 103 and the halogen lamp 16. The dimmer relay is adjustable by manipulating the control knob 117 on the front of housing 10. This adjustment is necessary so that the operator is able to effectively obtain a print which has the necessary detail clarity and also to enable him to compensate for line voltage variations which, in turn, would result in prints of varying clarity.

The light source for projecting the microfiche image to the sensitized paper will only remain on for a sufficient period of time to insure that a good print of the image is obtained. The exposure period is determined by the time that the contacts within switch 115 remain engaged because the actuation effected through the rotating cam disc 81. As the actuating arm of switch 115 becomes disenergized from the pin 90, the circuit will be interrupted and the light will be extinguished.

However, the actuation of the switch 115 in this manner will then reestablish a circuit through cam control microswitch 118 whereby the drive motor 63 is again energized. Thus, the exposed paper will move downwardly from the belts 60 into the toner and dryer 30. Because the toner pump motor 69 is already energized, the developer fluid in the toner will already have been pumped into well 67 so that the paper passing therethrough is fully immersed. The paper thereafter is fed through the squeegee rollers 70 and pass fan 74 so that it can be dried before it is fed out of the discharge chute 73.

The timer motor 80 will continue to drive the cam disc and effectively operate the switch 118 whereby the circuit to the drive motor 63 is interrupted. This is necessitated by the fact that there is no longer a sheet of paper within the apparatus. The cam disc 81 will also operate at this time to effectively actuate switch 101 to interrupt the circuit to the timer motor 80 and to reestablish the circuit to the switch 102 whereupon the viewing lamp 16 will be turned on so as to permit a subsequent microfiche viewing. It should be noted that the operation of the cam disc has likewise effected the movement of the mirrors 20 and 21 so that they are again in the viewing position.

The described control circuit for a microfiche reader-printer serves to combine the many features desired in a unitary apparatus and to provide a cycle of operation which is complete and which is effected in a minimum time period. Thus, it is possible for an operator to select any one microfiche image from a plurality of images and thereafter produce one or more prints as may be desired.

A further feature of the circuit relates to the ability of the apparatus to use either a positive or negative microfiche and to produce positive prints from either. This feature is rendered possible by the introduction of a switch 120 in the circuit between power pack 59 and corona 28. The two-positioned switch is disposed for ready setting of knob 121 on the front face of the housing as shown in FIG. 1. The switch effects a reversal in the charge on the paper passing through the corona 28 so that the resulting prints produced by the apparatus will still be of a position type. Of course, it must be kept in mind that a different type of paper must be used in this event unless the operator has been using paper having bichargeable characteristics. This feature is particularly desirable when it is necessary to work with both positive and negative microfiche films.

Thus far, the microfiche reader-printer described is fully disclosed and claimed in the copending application Ser. No. 414,608 filed Nov. 8, 1973, and is assigned to the assignee of the present invention. However, the microfiche reader-printer of the present invention also includes an improved paper cutter and a corona paper charging unit to be described hereinafter.

Figures 5, 6, 7:
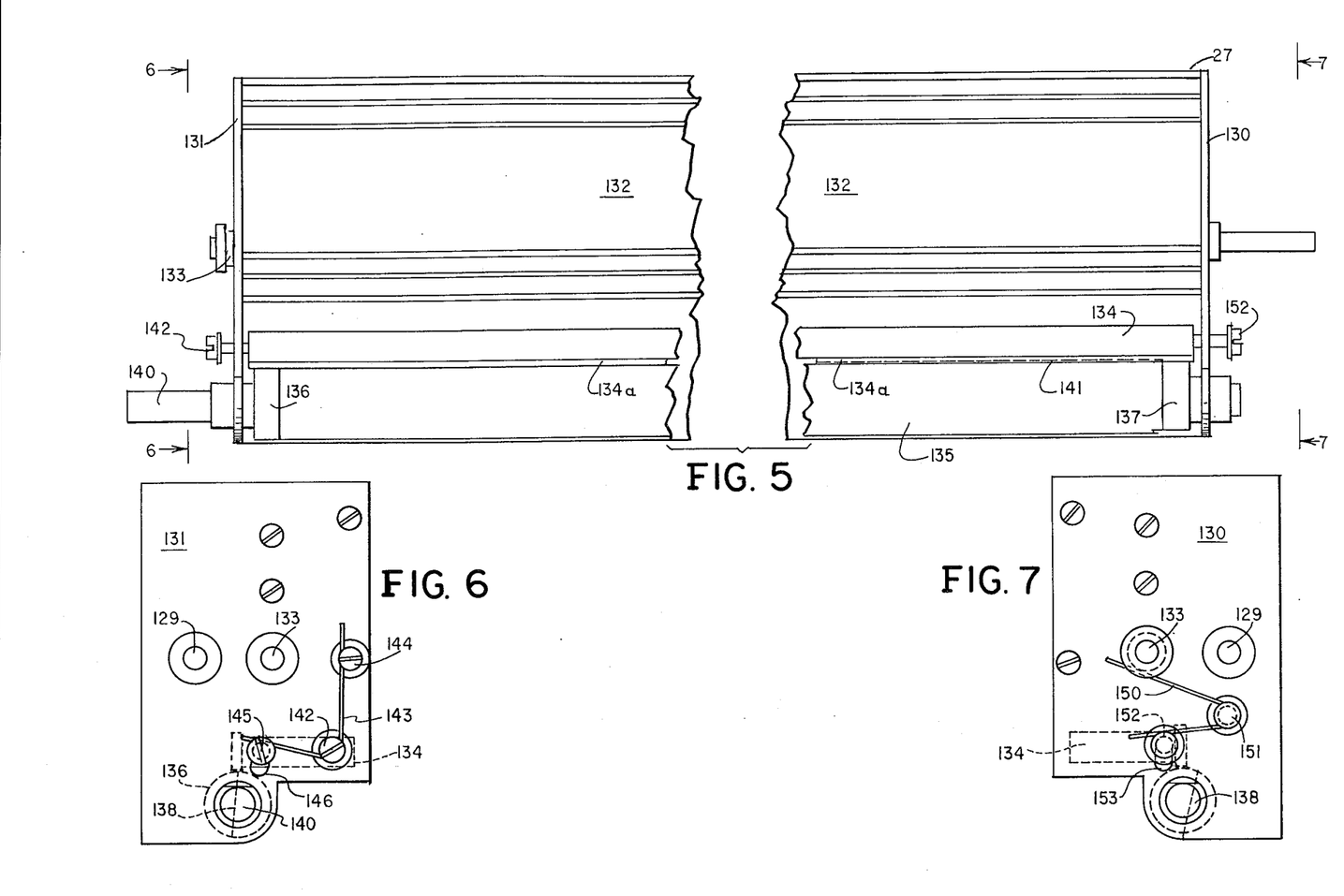
FIG. 5 is a bottom view of a rotary blade paper cutter embodying the present invention.
FIG. 6 is a side view taken in the direction of the arrows of the paper cutter of FIG. 5.
FIG. 7 is a side view of the paper cutter of FIG. 5 as viewed in the direction of the arrows.

The paper cutter of the present invention is shown in FIGS. 5 through 7. The paper cutter generally designated 27, comprises a frame including vertical end sidewalls 130 and 131, a bottom horizontal support panel 132 secured to each of the sidewalls, a paper feeder platform (not shown) extending between the sidewalls and spaced parallel to the bottom support panel 132, and a pair of feed rollers, the first disposed beneath the paper feed panel on axle 133 extending between the sidewalls, and a second roller of comparatively narrow dimension mounted for frictional engagement with the first roller on axle 129 located above and parallel to axle 133. The friction roller is located approximately in the midpoint of its support axle and frictionally engages the first roller.

The paper cutter additionally comprises a cutting bar 134 having a cutting edge 134*a* on its near end and a rotary cutting blade 135 disposed beneath bar 134. The rotary blade has a pair of cam surfaces 136 and 137 upon which cutting bar 134 rides. Cam 136 has a radius equal to the radius of the curvature of the cutting blade while cam 137 has a radius slightly smaller than that of the cutting blade so that the rotary blade is increasingly overlapping the cutting bar from cam 136 to cam 137. Additionally, as can be more clearly seen in FIGS. 6 and 7, the cutting blade is formed from a chordal section. As noted in FIG. 6, at cam 136 the surface of the cutting blade 138 is approximately at the center of the cam 136 while at cam 137, the blade surface is slightly more offset from the center. This results in the cutting blade being slightly inclined relative to the cutting bar edge to obtain a shearing action as the rotary blade is rotated. All of this is well known in the art.

The rotary blade has an extension 140 which engages a solenoid for activation. The position of rotary blade 135 relative to cutting bar 134 as shown in FIG. 7 is the position it obtains just prior to cutting a sheet between bar 134 and blade 135. The overlapping of rotary blade 135 to cutting bar 134 is generally designated at 141.

As shown in FIG. 6 cutting bar 134 is pivotably mounted onto sidewall 131. Pivot screw 142 extends through sidewall 131 and into cutting bar 134 at its far end. Spring 143 extending from a screw 144 which secures sidewall 131 to bottom support panel 132 extends around pivot screw 142 as shown and terminates at screw 145 which extends through a horizontal slot 146 in sidewall 131 and into cutting bar 134. Spring 143 therefore imparts a force to cutting bar 134 urging it against cam surface 136 in arcuate movement.

The paper cutters of the prior art have had additional structure at the end of the paper cutter comprising sidewall 130. That is to say, the cutting bars of the paper cutters of the prior art have been pivotably mounted at each end of the paper cutter. Unfortunately, paper cutters may be exposed to external torsional forces which effects their operation. A torsional force against the frame of a paper cutter of the prior art causes the overlapping between the cutting blade and cutting bar to be changed either resulting in the overlapping being too great or, at the other extreme, eliminating the overlap. This causes the paper cutter to jam up during operation rendering a microfiche reader-printer into which it is installed inoperative.

The paper cutter of the present invention does not suffer from this deficiency because at the end of the paper cutter comprising sidewall 130 the cutting bar is not pivotably mounted. As noted from FIG. 7, the end of the paper cutter comprising sidewall 130 does not have a paper cutting bar mounting which pivotably mounts the cutting bar 134. A resilient hair pin spring 150 extends from shaft 133 passed screw 151 and terminates at screw 152 which extends through a horizontal slot 153 of sidewall 130 into cutting bar 134 at its near end. Spring 150 and slot 153 coact to exert a horizontal force against cutting bar 134 urging it against cam surface 137 and to mount this end of the bar 134 at the sidewall 130. Because the cutting bar at sidewall 130 is not pivotably mounted, it may move horizontally only and the effect upon each end of the cutting bar due to external torsional forces is independent of the other. Therefore, notwithstanding external torsional forces being applied to the cutter frame of the present invention, the proper overlap 141 is maintained assuring proper overlap and operation of the paper cutter under such conditions.

In accordance with another aspect of the present invention, the microfiche reader-printer comprises a corona charging unit for electrostatically charging a layer of photoconductive material on a carrier member such as copy paper of improved but simple design. The corona unit of the present invention is shown in FIGS. 8 and 9.

The corona unit 28 comprises a pair of parallel, spaced assemblies 160 and 161. Each of the assemblies 160, 161 includes a supporting post 172, 171 and terminating post 175, 176 respectively. Each of the corona unit assemblies also includes an elongated aluminum housing having a U-shaped cross section. The assemblies are arranged so that one is the mirror image of the other with the supporting posts and terminating posts facing each other.

Figure 8:
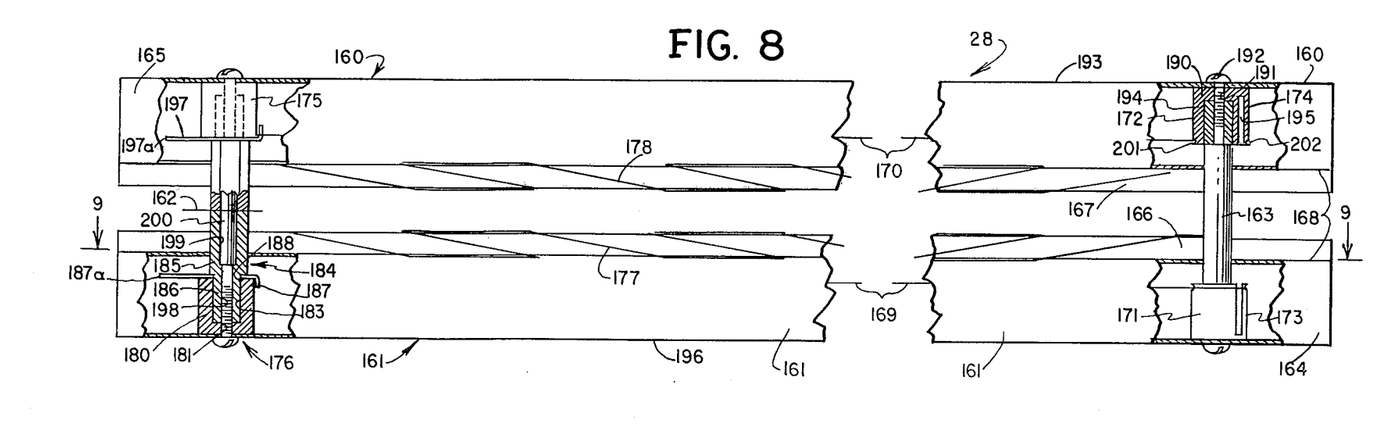
FIG. 8 is a side view with portions broken away, partly in cross-section, and partly cut away showing a corona unit embodying the present invention.
Figure 9:
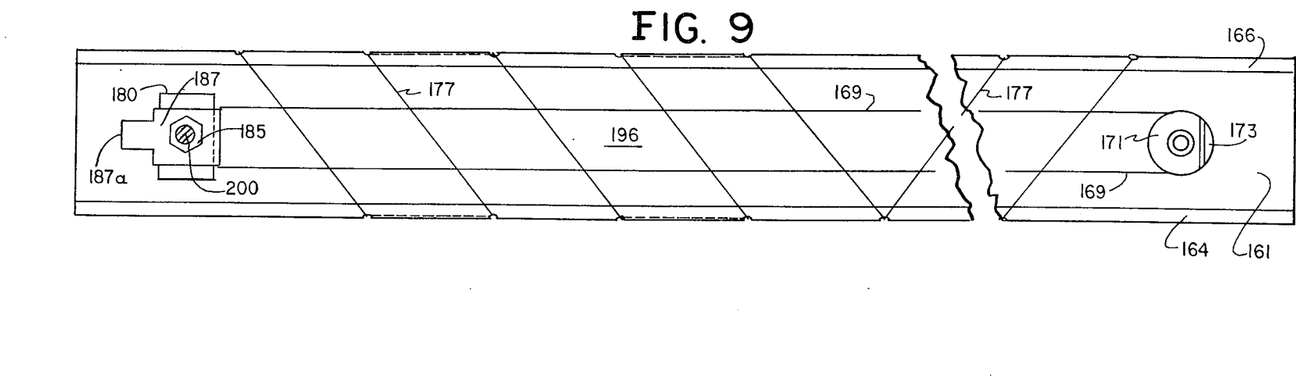
FIG. 9 is a cross-sectional view of FIG. 8 taken along lines 9—9.

As shown in FIG. 8 one of the sides 164, 165 of each of the U-shaped cross-sectional housings is shorter than the other side 166, 167. When the two assemblies are fitted together, the short sides 164, 165 form a large opening 168 for receiving the copy paper to assure that the paper will feed through the corona unit in a controlled manner.

High voltage tungsten corona wires 169, 170 extend generally across each half of the corona unit housings. The corona wires 169, 170 are looped around the facing supporting posts 171, 172 respectively located at one end of each housing and secured to the main cover sections between the sidewalls. They include integral spring members 173, 174 respectively to be hereinafter more fully described. The ends of the corona wires 169, 170 are secured to the facing terminating posts 176, 175 respectively also of novel construction located at the ends of the housing opposite their corresponding support posts. Each corona wire therefore comprises two parallel legs extending across each assembly. Insulating plastic monofilaments 177, 178 are wound about each corona housing as shown to preclude the corona wire from touching the copy paper as it is fed through the corona unit.

Because the wire supporting posts and wire terminating posts for each unit are identical, only one such terminating post and support post will be dealt with in detail.

The terminating post 176 comprises a rectangular member 180 of insulating material having a first bore 181 which is threaded to accommodate screw 182 for securing it to main cover section 196 and a counterbore 183 of greater diameter which meets the first bore from the side of the rectangular member opposite screw 182. The terminating post additionally comprises an insertable piece 184 having a hexagonally configured head 185 and a shank portion 186 of lesser diameter than the hexagonal head and dimensioned to be received by the counterbore of rectangular member 180. A conductive connecting and clamping plate 187 having a hole 188 dimensioned to receive the shank portion 186 of insertable member 184 but of lesser diameter than the hexagonal end portion 185 is shown in position relative to rectangular member 180 and insertable member 184. The shank portion 186 of insertable member 184 has threaded bore 198 so that upon turning of hexagonal end 185, the insertable piece may be threaded onto screw 182 to hold the terminating post together. A counterbore 199 of member 184 receives connecting pin 200 which rests on the shoulder formed by bores 198 and 199 which connects assembly 161 to the terminating post 175 of assembly 160. Because the terminating posts are identical, terminating post 175 also receives pin 200. As shown, the hexagonal heads are separated by insulating and spacing member 162. The height of the terminating posts and thickness of member 162 provides proper assembly spacing at this end of the unit.

Support post 172 comprises a generally cylindrical member 190 of sufficient diameter to allow a desired corona wire spacing and of insulating material having a first bore 191 which is threaded to receive screw 192 for securing the generally cylindrical member to main cover section 193 of corona unit 160. The support additionally comprises a counterbore 194 of enlarged diameter compared to the first bore which receives hollow tube spacer 163 therein. A chordal section 195 parallel to the center axis of support post 172 provides an upstanding tension member 174 to provide tension on corona wires 170. Therefore, the tension member 174 is integral with the support post reducing the number of necessary elements for providing wire tension and support.

At the top of cylindrical member 190 around its periphery is a groove 201 for receiving the corona wire to maintain it in a fixed position relative to the sidewalls 165, 167 of corona unit assembly 160. Tension member 174 also has a groove 202 for the same purpose. Supporting post 171 also receives tube 163 which connects this end of the assemblies together and provides proper spacing.

In operation, corona wire 169 is first placed under the plate 187 and is run across the corona unit assembly around post 171 and tension member 173 and back again under the plate 187. The wire is then pulled into tension and the hexagonal head 185 of insertable member 184 is turned onto screw 182 and tightened to securely hold the corona wire in place between plate 187 and rectangular member 180. Plate 187 includes a flange for positioning it relative to bore 183 and to preclude rotational movement of the plate. A knife edge is used to cut the corona wire at the peripheral edge of the connecting plate 187. The plate also serves to provide a terminal 187a, 197a for each plate where the operating voltages are connected to the unit. Insulating member 162 serves to preclude arcing between the terminals.

The positioning of the corona wire relative to the sidewalls, the main cover sections 193, 196 as well as the copy paper surface is important. Each corona wire must be far enough from the sidewalls and from the opposite corona wire to preclude arcing. Additionally, the corona wire must be close enough to the paper without touching in order to optimize the electrostatic charging efficiency of the paper. These parameters are generally determined by empirical methods, that is to say, different relative positions must be experimented with to determine the optimum relative placement of the corona wires and other elements of the assembly.

The present invention provides a simplified corona structure. Complicated corona wire supports and tensioners are avoided. By virtue of the fact that the terminating posts and support posts are of insulating material between the screws, housings and corona wires, proper insulation is provided.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A rotary paper cutter for cutting a sheet of paper horizontally fed therethrough comprising:
    a frame comprising a pair of end vertical sidewalls and a horizontal support member therebetween;
    a rotary cutting blade having first and second ends and a traveler cam at each said end, one said cam being smaller in radius than the other and said blade mounted between said sidewalls for cutting engagement with the paper sheet above the paper sheet;
    a cutting bar having a cutting edge on the near end thereof, said cutting edge being disposed beneath said cutting blade for cooperative engagement with said blade to cut a paper sheet therebetween, said bar having first and second ends, said first end being mounted to one said sidewall about a pivot at the far end of said bar and arranged for arcuate movement about said pivot, and said second end being mounted at the other said sidewall and arranged for horizontal movement only; and
    means at each said bar end for urging said bar ends against said blade cams, said different cam radii causing said blade to overlap said bar by a desired amount;
    whereby, the independent mounting of said bar ends assures the maintenance of said desired overlap notwithstanding inadvertent torsional forces applied to said frame.

2. A rotary cutter in accordance with claim 1 wherein said cam of smaller radius is located at said blade second end and where said blade and said bar are aligned to match said bar second end with said blade second end and said bar first end with said blade first end.

3. A rotary cutter in accordance with claim 2 wherein said other sidewall includes a horizontally extending slot and wherein a mounting pin extends through said slot and into said bar second end, said slot and pin coacting to mount said bar second end at said other sidewall and to allow only horizontal movement of said bar second end.

4. A rotary cutter in accordance with claim 3 wherein said slot is located adjacent to said near end of said bar and wherein said pin extends through said slot and into said near end of said bar.

5. A rotary cutter in accordance with claim 4 wherein said means at said bar second end for urging said second bar end against said cam at said blade second end comprises resilient means.

6. A rotary cutter in accordance with claim 5 wherein said resilient means comprises spring means.

7. A rotary cutter in accordance with claim 6 wherein said spring means comprises a hair pin spring.

8. A rotary paper cutter for cutting sheets of paper horizontally fed therethrough comprising:
    a frame comprising a pair of end vertical sidewalls and a horizontal support member therebetween;
    a rotary cutting blade having first and second ends and a traveler cam located at each end thereof, one said cam being smaller in radius than the other and located at said second blade end, said blade mounted between said sidewalls for cutting engagement with the paper above the paper sheet;
    a cutting bar having a cutting edge on the near end thereof, said cutting edge being disposed beneath said cutting blade for cooperative engagement with said blade to cut a paper sheet therebetween, said bar having first and second ends, said first end being mounted to one said sidewall about a pivot at the far end of said bar and arranged for arcuate movement about said pivot, and said second end being mounted at the other said sidewall and arranged for horizontal movement only, said other sidewall having a horizontally extending slot adjacent said near end of said bar, and said bar arranged to match said bar second end with said blade second end and said bar first end with said blade first end;

a mounting pin extending through said slot and into said bar second end at said near end for mounting said bar second end at said other sidewall and to allow only horizontal movement of said bar second end; and resilient means at each said bar end for urging said bar ends against their respective blade cams radii causing said blade to overlap said bar edge by a desired amount;

whereby, the independent mounting of each said bar end maintains said desired overlap notwithstanding inadvertent torsional forces applied to said frame.

* * * * *

UNITED STATES PATENT OFFICE
CERTIFICATE OF CORRECTION

Patent No. 3,960,042                Dated June 1, 1976

Inventor(s) Emil Tiger

It is certified that error appears in the above-identified patent and that said Letters Patent are hereby corrected as shown below:

Column 5, line 16, the word "morrors" should read -- mirrors --; Column 5, line 19, the word "safts" should read -- shafts --; Column 6, line 47, the word "necessry" should read -- necessary --; Column 7, line 33, the word "Exposed" should read -- Exposure --;

Signed and Sealed this

Twenty-second Day of March 1977

[SEAL]

Attest:

RUTH C. MASON
Attesting Officer

C. MARSHALL DANN
Commissioner of Patents and Trademarks